INVENTOR
NORMAN DUNLAP
by JEFFERS & YOUNG
ATTORNEYS

Jan. 31, 1967 N. DUNLAP 3,301,611
COMPOUND BEARING
Filed Sept. 7, 1965 5 Sheets-Sheet 2

INVENTOR
NORMAN DUNLAP
by JEFFERS & YOUNG
ATTORNEYS

Jan. 31, 1967   N. DUNLAP   3,301,611
COMPOUND BEARING
Filed Sept. 7, 1965   5 Sheets-Sheet 4

INVENTOR
NORMAN DUNLAP
by JEFFERS & YOUNG
ATTORNEYS

ID
3,301,611
COMPOUND BEARING
Norman Dunlap, St. Mary's, Ohio, assignor to The Minster Machine Company, Minster, Ohio, a corporation of Ohio
Filed Sept. 7, 1965, Ser. No. 485,486
9 Claims. (Cl. 308—5)

This invention relates to compound bearings and is particularly concerned with a novel compound bearing arrangement embodying the advantages of both an antifriction bearing with regard to its inherent low friction and a friction-type bearing of the sleeve or slide bearing type characterized by its high load-carrying capabilities.

This applicaiton is a continuation-in-part of my earlier application filed July 29, 1963, Serial No. 298,134, now abandoned.

In a great many arrangements where bearings are employed, the type of usage encountered is such that the normal loading on the bearings will vary substantially, being relatively high at one time and relatively low at another time. When the condition of bearing loading is relatively low, the two relatively movable parts between which the bearings are mounted can best be supported on bearings of the antifriction type which provide free movement of the parts without resistance owing to drag in the bearing. On the other hand, when bearing loading is relatively high, antifriction bearings are inadequate because of the inherent slight area of contact between the bearing elements. For these reasons, rollers or balls as the bearing elements, having line or substantially point contact, are inadequate because of the stresses on the bearing elements which result in deterioration and short life of the bearings under such conditions.

In addition to the inherent low friction characteristics of the antifriction bearings, such antifriction bearings do not necessitate a slight spacing as do the sliding bearings; therefore, bearings of the antifriction type can be preloaded to provide the valuable function of accurately defining clearance spaces for the coacting sliding bearing surfaces which, following static operation conditions, become immediately available for dynamic operation conditions. This has a substantial advantage in that once the components of the machine are changed from static to dynamic condition the oil film present develops load-carrying capabilities in the sliding bearing and prevents metal-to-metal contact in the sliding bearing. Under static conditions, the oil film between the sliding bearing tends to drain out and can lead to metal-to-metal contact. But in the present invention, by maintaining a suitable clearance through the antifriction bearing, the oil film is retained in place by its surface tension and is, therefore, always in place to resist shock loads which are beyond the capacity of the antifriction bearing and is available for load-carrying abilities immediately upon resuming dynamic conditions.

Adequate bearing mounting is a necessity, not only in presses, but in a wide variety of machine tools, including but not limited to, those involving grinding, milling, planing and many other applications as well, and the present invention is adapted for any of these applications as will become clear from a consideration of the following description. The present invention is of particular use where there is a different condition of loading from time to time, i.e., intermittent shock loading which is encountered during intermittent cutting or planing or such similar operations in various machine applications. Likewise, such shock loading could occur because of dropping of a heavy workpiece on a support platform or table of a machine. All of these different conditions should be contemplated in providing for proper bearing operation, and in the present invention such conditions are contemplated and are provided for by the compound bearing arrangement.

In previous bearing arrangements, those skilled in the art have discounted the use of antifriction bearings having ball or roller type bearing elements since the line or point contact arrangements made them unsuitable for sustaining heavy loads, but when the greater load capacity friction-type bearings were substituted, it was found that objectionable phenomena such as stick-slip occurrence, owing to the very thin oil film under extremely heavy loads, produced equally objectionable operating conditions. The present invention effectively overcomes such objectionable phenomena by effectively controlling the thickness of oil film, not only at the beginning of operation but throughout the bearing operation, and in this manner, the transition from static to dynamic conditions is effectively provided for without the usual problems of free-wheeling, chatter, jumping, stick-slip, etc.

At the same time, the objectionable feature of "hydrofoil" effect, normally encountered in a sliding bearing, wherein the hydrodynamic oil film pressure causes one of the bearing surfaces to separate from the other bearing surface owing to the increase of pressure during dynamic conditions, can be effectively overcome by using a preloaded antifriction element which is deformable and is backed up by a slidable type oil film surface.

It was heretofore a substantial problem in the art to provide accurately defined machine table positions which would hold such positions during both static and dynamic conditions. Obviously, because of the tendency of the table or other work support surfaces to vary their position responsively to transition from static to dynamic conditions, this condition necessarily detracted from the accuracy with which machining operations could occur. The present invention provides for such contingency by not only accurately defining the thickness of the lubricating film between the relatively movable parts of the slide bearing under static conditions, to avoid metal-to-metal contact, but provides also that such clearances will remain the same during dynamic conditions in order to achieve accurate machining operation.

It is a further object of the invention to provide an antifriction bearing which incorporates a preloaded deformable bearing element combined with an oil film bearing which is pressurized immediately upon relative movement in order that such oil film will assume immediately load-carrying capabilities and become the principal load-bearing medium in place of the antifriction bearing. But such transfer can occur not only as motion develops but under shock load as well, thereby serving to protect the antifriction bearing which is inherently limited in sustaining such loads.

The above and foregoing objects and features of the invention are provided by a novel bearing arrangement which combines the advantages of both a rolling bearing surface and a sliding bearing surface which coact in order to provide the advantages of both.

Refering now to the drawings wherein a plurality of example embodiments of the invention are illustrated, by way of example, there is illustrated.

Figure 1:
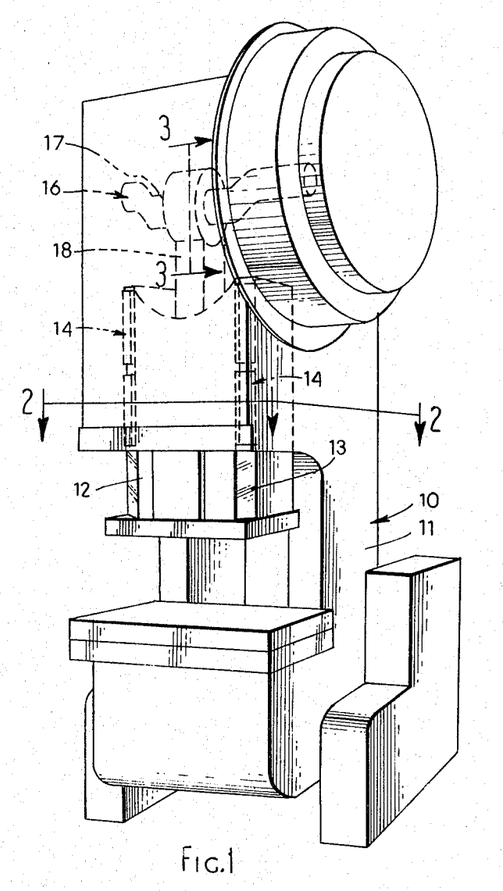
FIGURE 1 is a somewhat diagrammatic perspective view of a mechanical press illustrating locations for bearings constructed in accordance with the present invention.
Figure 2:
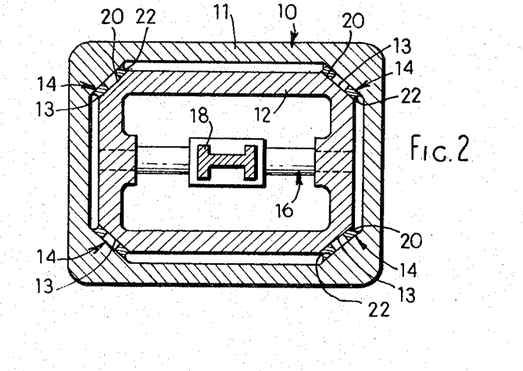
FIGURE 2 is a sectional view taken on line 2—2 in FIGURE 1.

Referring now to the drawings, and particularly to FIGURE 1, there is illustrated a press 10, including a press frame 11 having a slide 12 which is reciprocably movable and is guided at its corners 13 (FIGURE 2) on bearing arrangements which are designated generally by reference numeral 14.

At the upper end of the press is a rotatable crankshaft 16 having a crank pin 17 attached to a connecting rod 18 which serves to raise and lower the slide 12. Rotation of the crankshaft 16 will, therefore, reciprocate the slide 12 within the press frame 11.

The bearing arrangement, according to the present invention, can be employed in connection with the bearings 14 at the corners 13 between the press frame 11 and the slide 12. The bearing combination 14 at the corners 13 can best be seen in FIGURES 2, 6 and 7. With reference to these figures, each corner of slide 12 has a surface 20 formed thereon which is in spaced parallel relation to a similar or complementary surface 22 on the press frame 11. Disposed in the space between these surfaces is a flat bearing member 24 (FIGURE 6) which may be attached either to the slide 12 or to the frame 11 and which slidably engages the opposing surface. In the illustration, the flat bearing member 24 is secured to the frame 11 (FIGURE 6), as for example, by bolts 25, or the like, and the surface 23 of the flat bearing member 24 slidably engages the opposing surface 20 of the slide 12. It is also comprehended within the scope of the invention that member 24 can be floatingly arranged in the space between the frame and slide so as to slidably engage both surfaces 20 and 22.

Figures 5, 6, 7, 20:
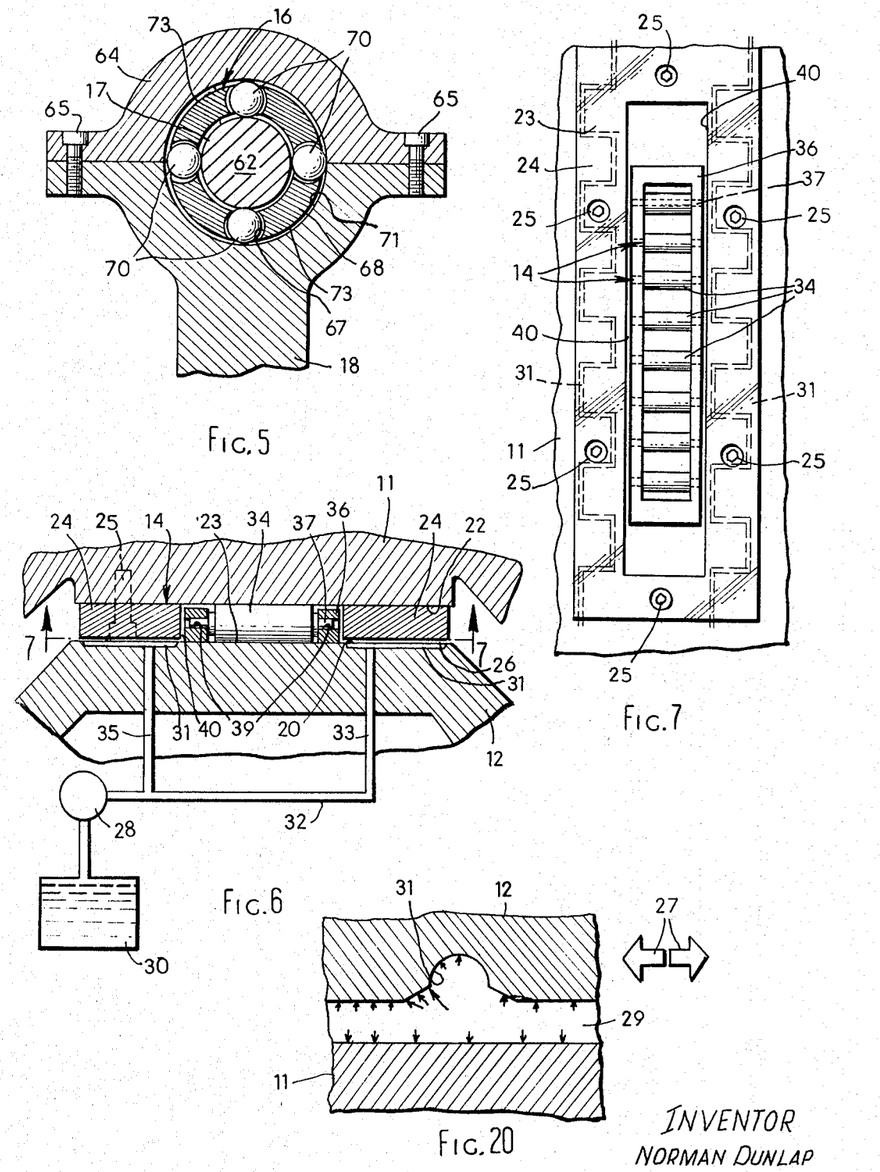
FIGURE 5 is a sectional view taken on lines 5—5 of FIGURE 3.
FIGURE 6 is an enlarged fragmentary view of a compound bearing at one of the corners of the slide and press frame in FIGURE 2.
FIGURE 7 is a view looking at one side of the compound bearing, looking in the direction of the arrows 7—7 in FIGURE 6.
FIGURE 20 is an enlarged schematic view of an oil film under kinetic conditions and serving as a hydrodynamic bearing.

In general, the provision of a flat bearing member 24 of this nature serves to guide the relatively movable parts of the press along accurately predetermined paths and prevents relative lateral movements between the parts 11 and 12. The flat sliding bearing arrangement between surfaces 20 and 22 has an oil film within the gap 26 (FIGURE 6), and this gap is provided as a precisely dimensioned clearance defined by the preloaded rollers or balls. A pump 28 supplies the oil from a sump or reservoir 30 and conveys such oil to the gap or space 26 by means of conduit 32 having branch lines 33 and 35 (FIGURE 6). At the gap 26 is a recess wedge 31 which serves to wedge the oil film (FIGURE 20) causing the film 29 to become pressurized immediately upon relative movement occurring between slide 12 and frame 11 as indicated by the arrow 27 (FIGURE 20). This build-up of fluid pressure in the gap is immediate, and such oil film assumes load bearing capabilities immediately and takes over the functions of the antifriction bearing.

In accordance with the present invention, the compound bearing disposed between each of the corners of the slide 12 and press frame 11 includes antifriction roller bearings designated generally by reference numeral 34. The plurality of roller bearings 34 are mounted within a carrier or cage 36 which receives the roller bearings and maintains their spaced relation through journal pins 37 (FIGURES 6 and 7) which are mounted on the ends of the rollers and are received within openings 39 in the spaced sides of the cage 36. The cage 36 is in turn mounted within a slot or recess 40 of a flat bearing member 24 which in turn is secured in some suitable manner as by bolts 25, or the like, to frame 11. The surface 23 of bearing member 24 is superimposed by bearing surface 20 having recess wedge 31 which is projected schematically onto surface 23 (FIGURE 7) to show how the hydrodynamic bearing support develops. Because the roller bearings 34 and cage 36 can move within the slot 40, there is provided an antifriction rolling movement between the slide and frame, reducing such movement to minimal frictional resistance.

With no lateral loading upon the press slide, the press frame 11 will laterally support the slide 12 entirely upon the antifriction roller bearing elements 34, and there will be minimum drag imposed upon the slide 12 by the antifriction bearings 34, and the slide 12 will be accurately guided during such vertically reciprocable movement. This last mentioned feature is highly important and contributes to the efficiency and utility of the press.

When the press slide 12 is subjected to lateral loading, or to tilting forces thereon, both of which kinds of loading occur during work performed in the press, the slide 12 is subjected to lateral thrust in one direction or the other, and the bearings will receive additional thrust when such additional lateral force is effected. The additional lateral loading which is directed toward the antifriction roller elements can be sufficient to produce "Brinnelling" of the surfaces on which the antifriction bearings roll, and, furthermore, such stressing of the roller elements can be in excess of the elastic limits thereof so as to permanently deform the roller elements. Such additional lateral thrust, particularly when in the form of shock thrust, is not borne by the rollers but instead is borne by the oil film between the friction sliding bearing surfaces. The oil film within the gap 26 separating the confronting surfaces of bearing member 24 and slide 12 is maintained to a predetermined dimension by means of the preloaded rollers 34. Although the film is quite small, it is nevertheless large enough to receive and sustain the lateral loading which occurs under shock load and is beyond the forces properly sustainable by the antifriction roller elements 34 which under a high magnitude of forces tend either to "Brinnell" or distort the bearing and bearing support surfaces.

In this manner, the advantages of both the antifriction and friction type bearings are obtained, including the accuracy and freedom of movement which is characteristic of the antifriction bearing which occurs under light load and no load, and the relatively heavier weight-sustaining ability of a friction type bearing in which orders of deflection are lower and in which possible damage to the opposing surfaces are reduced.

Figure 3:
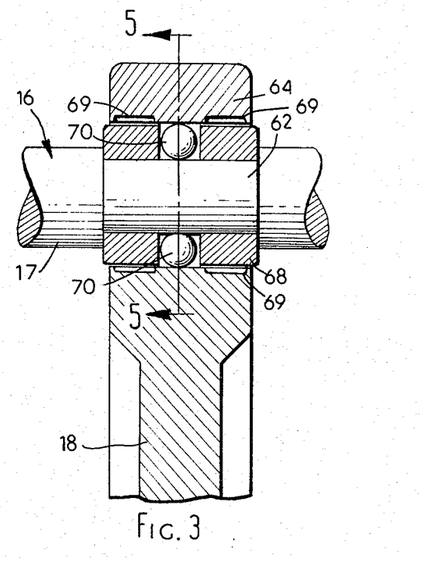
FIGURE 3 is a sectional view taken on lines 3—3 of FIGURE 1.
Figure 4:
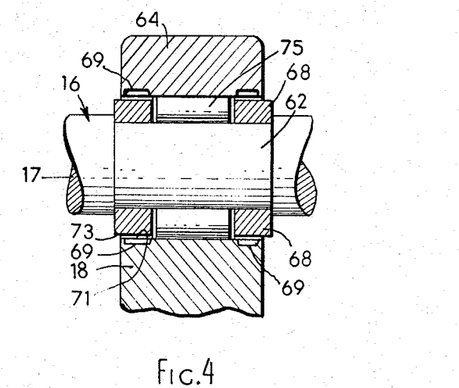
FIGURE 4 is a further embodiment of the bearing arrangement in FIGURE 3, showing the use of roller bearing elements in place of the ball elements in FIGURE 3.

Reference is next made, in FIGURES 3, 4 and 5, to the fact that the invention is applicable to rotary bearings as well as translatory bearings. Between the pin 17 and crankarm 18 is a sleeve bearing 68 and a number of spaced balls 70 which engage reduced diameter pin section 62 of crankshaft pin 17. The bearing sleeve or cage 68 has a number of pockets 67 (FIGURE 5) within which are confined the balls 70. The balls ride at their inner periphery against the reduced diameter pin section 62 and at their outer end against complementary semicircular races 71 in connecting rod 18 and portion 64 which is a journal half, secured by bolts, or the like, 65 to the connecting rod 18. The slight spacing between the outer edge of the circle of antifriction bearings 70 and cage 68 insures that originally the bearing surface is provided by a rolling or turning engagement of the balls 70 with the opposed race surface 71. As the load increases, however, the balls 70, being hollow, are deformed from a circular to an oblong shape (the dimensions for the seat 67 permitting such deformation), and the outer surface 73 of the cage 68 engages the opposed surface 71 of connecting rod 18, or journal 64, and using thereby a hydrodynamic bearing surface. The cage 68 has a recess wedge 69 which compresses the oil film and provides a wedge pressurizing the oil and immediately causing the oil film to assume the principal load-carrying capabilities and supplanting the antifriction bearing in the same manner as described in FIGURE 20. The oil film which is provided within the gap between 71 and 73 produces an oil wedge which serves as the bearing support surface, and this occurs as shock load is imposed between the connecting rod 18 and crankpin 62. The transfer of load from the antifriction bearing to hydrodynamic bearing occurs within the elastic limit of the antifriction bearing so that these bearings are not loaded beyond their limits.

Referring next to the embodiment of FIGURE 4, the rotary bearing, as indicated, can be constructed of a roller bearing as well as a ball bearing. The roller bearing 75 consists of a number of spaced rollers 75 which are received within the confines of a cage 68 and engage the small diameter section 62 of the crankarm pin 17, the same as in the previous embodiment. The diameter of the roller bearing 75 is dimensioned similarly to the diameter of the ball bearing 70 in the previous embodiment so that under light load or no load conditions the support provided between connecting rod 18 and crankshaft 17 consists of the plurality of spaced antifriction rollers 75; but when high orders of loads occur from shock loading, or the like, the load is sustained by the oil film between the sleeve bearing element 68 and its opposing surface 71. As kinetic conditions in the bearing develop, the oil film becomes pressurized by a wedge action from the recess wedge 69 as previously described. The hydrodynamic oil film has a much higher load-carrying capability than the antifriction roller bearings and eliminates stick-slip phenomena because the support does not depend upon excessively thin oil films under extremely heavy loads. On the contrary, there is a control of the oil film because of the controlled clearance between surfaces 71 and 73, this being determined by the diameter of the preloaded spaced roller 75. The usual problem of free wheeling which is encountered with unloaded antifriction bearings is also avoided, such problems arising in the form of chattering, jumping, etc., because the antifriction bearings are functional only under light load or no load conditions. Moreover, the bearings, being protected against "Brinnelling" and distortion, also prevents occurrence of such free wheeling problems.

Figures 8, 9, 10:
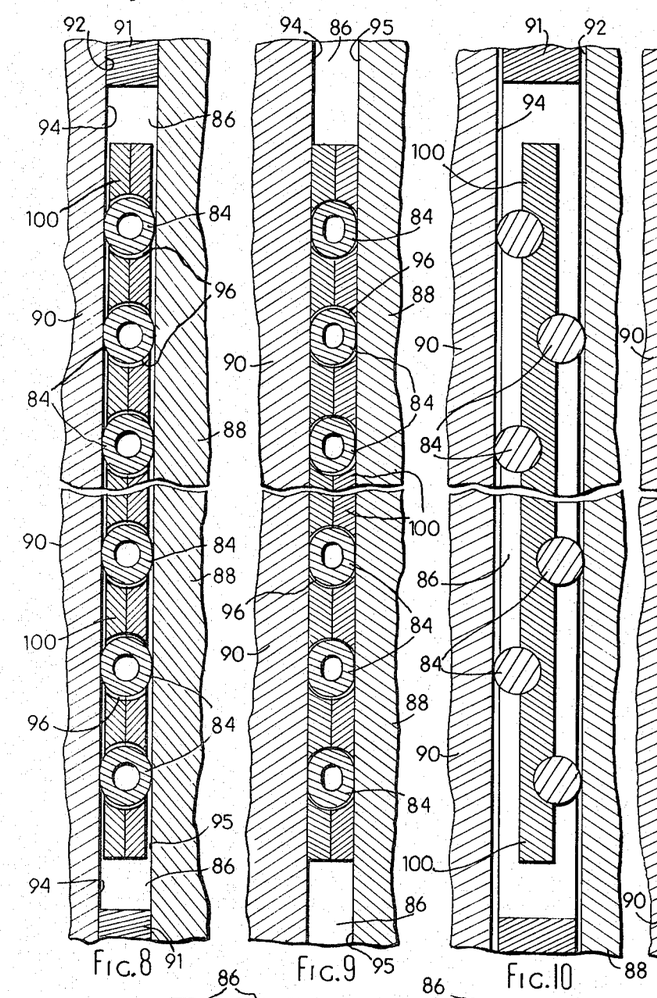
FIGURE 8 is a longitudinal section view of a further compound bearing arrangement in which the bearing cage is modified from the construction shown in FIGURE 7.
FIGURE 9 is a further embodiment of the invention in which the bearing cage serves as a friction sliding surface when the load is transferred from the antifriction rollers to sliding friction surfaces provided by the cage.
FIGURES 10 and 11 illustrate a further embodiment of the invention in which the compound bearing is comprised of preloaded antifriction rollers or balls mounted on a deformable backing which deforms from the position shown in FIGURE 10 to that of FIGURE 11 when subjected to shock or normally destructive forces allowing the forces to be absorbed or directed onto a friction-type sliding surface illustrated at the upper and lower ends of the figures.

Referring next to the embodiment of FIGURE 8, the compound bearing may be comprised of a number of hollow rollers 84. These hollow rollers are each confined within a gap 86 between two relatively movable members 88 and 90, the member 88 having attached thereto a flat bearing member 91 with a surface 92 engageable with opposed surface 94. The hollow rollers 84 are received within seats 96 which are enlarged to permit deformation of the rollers 84 which serve as the no load or slight load bearing surfaces. Under shock load or dynamic conditions, bearing support is assumed from the antifriction bearing roller surfaces to the sliding friction support provided between surface 92 of flat bearing member 91 and its opposed surface 94 between which there is a thin layer of lubricating oil, the hydraulic pressure thereof preventing metal-to-metal contact. The roller bearings 84 are spaced apart within the pockets 96 in carrier 100 which is comprised of two substantially flat plates secured together and having complementary recesses which define the pockets 96 for receiving the rollers 84. The carrier 100 is free to move within the gap 86 in order to provide rolling action of the antifriction bearings 84. The roller bearings 84 and flat friction bearing surfaces 92 and 94 provide a combination or compound bearing action the same as in the previous embodiment wherein there is maintained a suitable gap between the slidable bearing surfaces 92 and 94 by the antifriction roller bearings 84 serving as the primary bearing surfaces until either shock loading occurs or until movement occurs, at which time the oil film is pressurized by wedge action in the manner described previously (FIGURE 20), and the sliding bearing assumes the load-carrying capabilities.

Referring next to the embodiment of FIGURE 9, the sliding bearing surfaces, instead of being provided by a separate member 90, can be provided instead by the bearing support 100. As shown, the rollers 84 are preloaded, and the surfaces 94 and 95 engage the opposite sides of bearing carrier 100 which thereby effects the sliding bearing that becomes the principal bearing support under heavy load conditions. Therefore, under light load the principal bearing support for the compound bearing statically is through the rollers 84, but under heavier dynamic or shock loads, the diameter of the roller bearing is such that it will permit the surfaces 94 and 95 to directly engage the opposite faces of the bearing carrier 100. The bearing moves within the gap of 86 to permit the rolling action of the antifriction bearing portion of the compound bearing.

Figure 11:
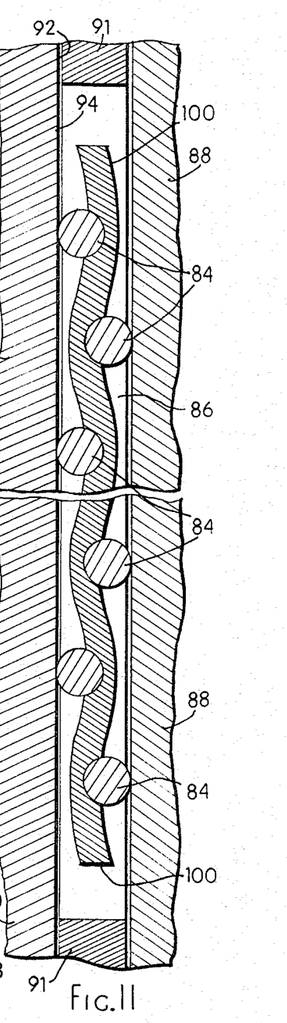

Referring next to the embodiment of FIGURES 10 and 11, the preloaded roller bearings 84 are spaced on opposite sides of a bearing carrier 100, and the bearing as a whole can move within gap 86 to provide antifriction roller bearing action between the two surfaces 88 and 90 under light load or no load conditions. Under shock load or high loads during dynamic conditions, the backing 100 will be deflected to the shape indicated in FIGURE 11, and surface 94 will engage slidable bearing carrier member 91, the two surfaces 92 and 94 coming into slidable bearing relation with a thin coating of lubricant therebetween.

When the loading is relieved, the backing member or carrier member 100 for the roller bearings will resume the shape indicated in FIGURE 10. In the embodiment in FIGURES 10 and 11, the compound bearing depends for its operation not upon deflection of the rollers 84, but instead upon deflection of the carrier for the rollers. This embodiment can also use, in place of rollers, a plurality of spaced ball bearings which are suitably spaced and supported on opposite sides of the carrier 100, but in this instance, the deflection of the carrier 100 shapes it from one edge to the other with a compound bending from both of its opposite sides.

In this embodiment, as in the previous embodiments, there is a combination of both antifriction and sliding friction bearing surfaces, and a combination of both bearings serve to incorporate advantages of both bearing systems.

Figures 12, 13:
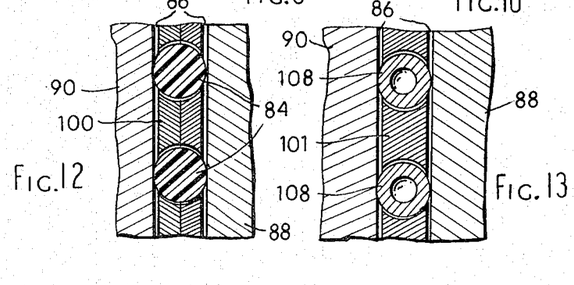
FIGURE 12 illustrates a portion of a compound bearing using deformable nonmetallic solid balls as the antifriction bearing portion of the compound bearing.
FIGURE 13 is similar to FIGURE 12 but illustrates hollow metal balls.

Referring next to the embodiment of FIGURE 12, the rollers 84 instead of being hollow metallic members may be compressible plastic rollers of a suitable composition and deformed within the pockets 96 of the carrier in which such distortion occurs, the surfaces of the relatively movable members then moving closer together within the gap 86 whereby the sliding bearing portion of the compound bearing becomes effective. The composition of the roller bearings 84 does not, however, form a part of the present invention. The characteristic functional requirement in this embodiment is that the roller be capable of sustaining the necessary normal force during light load or no load conditions to provide antifriction rolling contact and be deformable as the bearing load is assumed by the sliding bearing surfaces under shock load conditions or dynamic conditions. The deformable ball resumes its original shape when such loads are relieved.

Referring next to the embodiment of FIGURE 13, in this embodiment, as illustrated in fragmentary view, the use of hollow balls 108 is demonstrated in place of rollers 84 (FIGURE 8). In all other respects, the structure and function of the bearing is the same as in either FIGURES 8 or 9 and can operate in the same manner except with spaced deformable ball bearing elements instead of roller bearing elements.

Figures 14, 15, 16, 17:
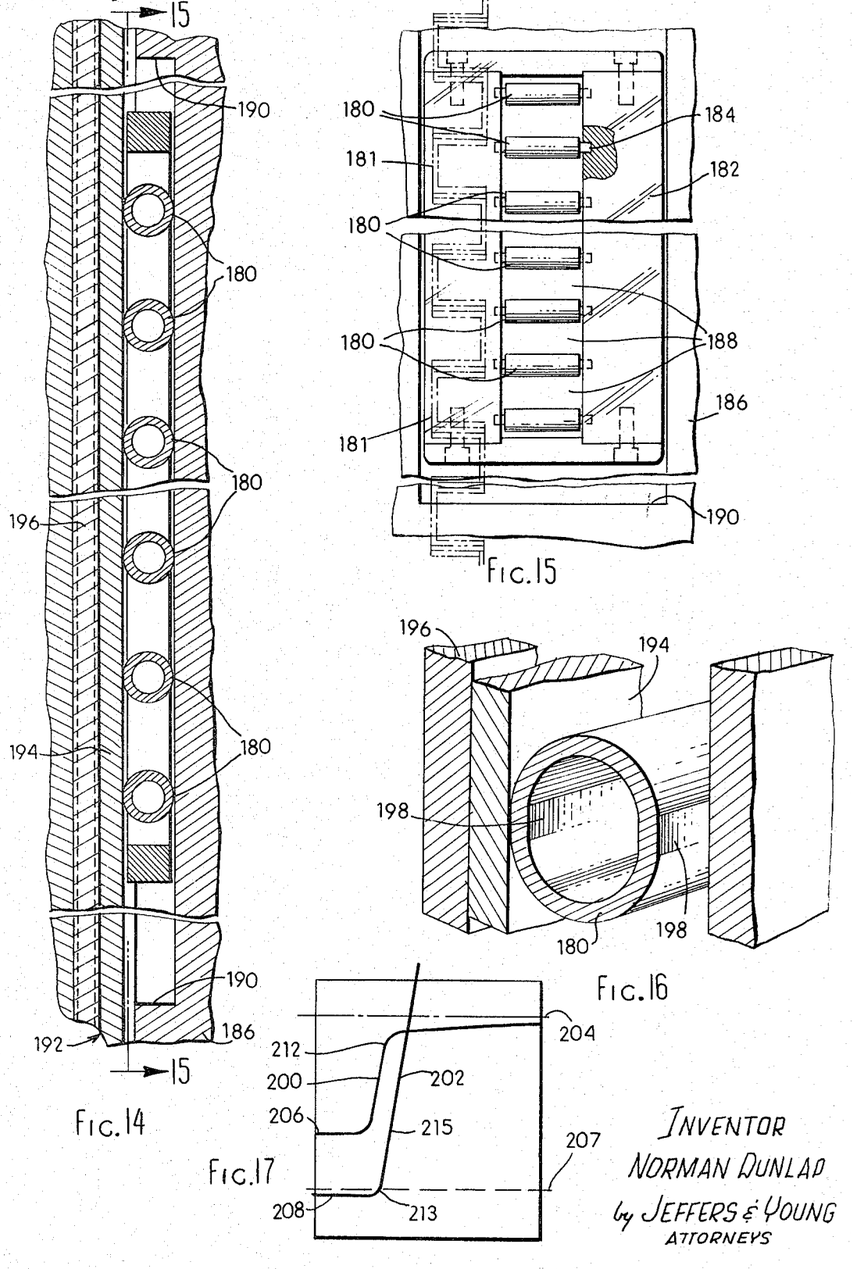
FIGURE 14 illustrates the use of a compound bearing in combination with an adjustable gib having a wedge or other adjustable member.
FIGURE 15 is a foreshortened detailed view looking in the direction of the arrows 15—15 in FIGURE 14.
FIGURE 16 is an enlarged isometric detail view of a roller deformed from line to annular surface contact.
FIGURE 17 is a force diagram showing the distribution and occurrence of forces during loading on the respective bearing elements of a compound bearing.

Referring next to the embodiment of FIGURE 14, there is shown an arrangement wherein resilient antifriction bearing elements 181, hollow metal rollers, for example, are mounted in a carrier 182 by the pintle ends 184. In FIGURE 14 one movable member is identified at 186, and it has a recess therein at 188 in which the compound bearing is movable between and within which the compound bearing is retained by abutments 190 at opposite ends of the recess.

The other member which is movable relatively to member 186 is generally identified at 192, and it preferably comprises a movable gib member 194 adapted for being adjusted toward and away from member 186 by a wedge bar 196 which wedge bar 196 provides means for preloading the antifriction bearing elements so that they not only provide firm support between the relatively movable members, but the area of contact of the antifriction bearing elements is substantially increased. This provides for longer life of the elements and better support and greater insurance against "Brinnelling" of the surfaces over which the elements 180 roll.

Referring to FIGURE 15, the flat slidable bearing 182 has projected on its surface the wedge recess 181 which pressurizes the oil film to cause the film to assume load-carrying capabilities under dynamic conditions (FIGURE 20) assuming the load-carrying function from the antifriction bearing.

The manner in which the area of contact of the antifriction bearing elements is increased by preloading is illustrated in FIGURE 16 wherein the shaded area 198 on the antifriction bearing element represents the area thereof that is in engagement with the surface on which it rolls. This deformation under preload changes the engagement from line contact to area contact (FIGURE 16) improving the ability of the antifriction bearing to sustain load.

Referring next to the graph in FIGURE 17, there is illustrated schematically the action that takes place in a compound bearing constructed in accordance with the present invention.

The line 200 represents the load on the antifriction bearing elements, and the line 202 represents the load on the sliding bearing element. These loads may be measured, for example, in pressure per sqaure inch or some other measurement indicating the degree of loading in relative units. The dashed line 204 represents the maximum limit of pressure to be borne by the antifriction bearing elements and is within the elastic limit of the bearing element and the strength of the opposing surface of the bearing to prevent its "Brinnelling" or otherwise permanently deforming. It will be seen that the line 200 lies below the line 204 so as not to encounter these objectionable conditions.

In considering the lines, the point 206 which represents the preload on the antifriction elements is a point at which the compound bearing is stationary, and there is a relatively light loading or no loading of the bearing. At this point, assuming that there is no pressure supply to lubricant of the sliding bearing element, the load is sustained entirely on the antifriction bearing as represented by point 206, and no support is taken on the oil film element whose line is represented by 208 and which is under negative pressure or fluid surface tension. The no load line is represented by numeral 207. As the members 186 and 192 start to move relatively, and a lateral load is imposed thereon, there will be an increase in the bearing loading, and the increase in loading which is sustained entirely by the antifriction bearing elements is represented by portion 212 of line 200. The load on the antifriction bearing elements rapidly approaches an upper limit not exceeding, however, the maximum predetermined allowable loading thereon until the dynamic build-up causes the oil film load-carrying capacity to assume the load transferring the load-carrying capability of the compound bearing onto the sliding friction surface, this point being represented by point 213 on line 202. At point 213 the loading increases rapidly as indicated by portion 215 of line 202, and such loading can exceed and does exceed, as indicated in the graph, the loading on antifriction bearing represented by line 200. The loading on the sliding bearing surface (line 202) can, of course, exceed the maximum permissible loading of the antifriction bearing element indicated by line 204.

It will be understood that the graph in FIGURE 17 is qualitative and is purely diagrammatic, being provided merely for the purpose of indicating graphically the manner in which the load transfer takes place from the antifriction bearing elements to the sliding bearing element and the manner in which the sliding bearing element limits the maximum stress developed on the antifriction bearing elements.

The present invention is usable in substantially any circumstances where two relatively movable members have bearings disposed therebetween, including but not limited to relatively reciprocable members and relatively rotatable members.

Figure 18:
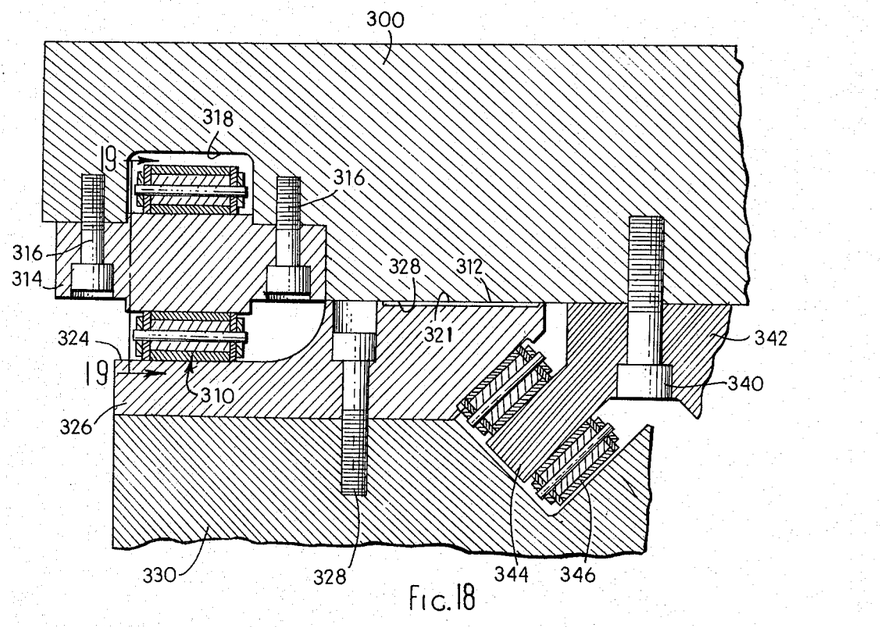
FIGURE 18 illustrates a compound bearing in combination with a machine table and support therefor.
Figure 19:
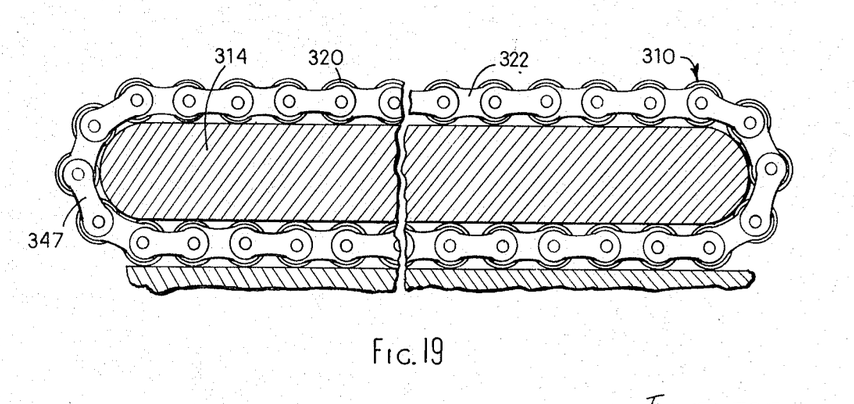
FIGURE 19 is an enlarged detail view of a plurality of roller bearings adapted to support the reciprocal table.

Referring next to the embodiment of FIGURES 18 and 19, there is shown a worktable 300 usable with a substantial variety of machine tools, including but not limited to grinding, milling or planing operations where there are encountered both shock loading conditions owing to intermittent cutting or planing and also owing to dropping of heavy workpieces on the table. The worktable is supported by a combination of anti-friction roller bearings designated generally by reference numeral 310 and by a slidable bearing designated generally by reference numeral 312. The antifriction bearing support is provided in the form of a mounting member 314 which is bolted to the worktable in some suitable manner as by bolt 316 and provides a recess 318 which permits free movement of a series of roller bearing elements 320 which describe a closed loop of movement and are secured together by an endless chain of connected links 322 so that the roller bearings will provide an endless roller bearing support between the worktable 300 and surface 324 of support 326. The support 326 is secured by bolt 328 to a foundation structure 330.

As the worktable 300 reciprocates, the weight of the table which is borne by the endless chain of roller bearings will support the weight of table 300 on surface 324 and provide a roller bearing support for such reciprocal movement. To provide for ideal bearing action, and particularly in order to avoid objectionable stick-slip conditions, the present invention provides for a fixed clearance between the opposed sliding surfaces 328 and 321, said clearance having an oil film of optimum dimensions which is designed for avoidance of objectionable stick-slip causing chatter. If this oil film is too small and the loading of the sliding bearing is high, then objectionable metal-to-metal contact may occur with its consequent high wear and scoring, and also objectionable stick-slip chattering is prone to occur. In machine operation, such occurrence is highly objectionable.

Under static conditions and under low load conditions, the antifriction roller bearings will sustain the entirety of the load, and the bearings are dimensioned so that surface 328 is raised from surface 321 by an amount sufficient to produce an oil film thickness of the desired dimension.

It has been further found that under kinetic conditions as the movement of the worktable 300 increases, the resultant greater pressure on the oil film between surfaces 328 and 321 produces a lifting or "hydrofoil" effect, tending to raise the table 300 independently of all other conditions, and this raising of the table introduces an error-producing extraneous factor of machine operation which can detract from the precision of machine operation, including operations previously mentioned, such as cutting and planing.

In order to prevent such lifting, there is secured, by bolting 340, to the table 300 a movable member 342 having an inclined reciprocable slide 344 and a plurality of rollers 346 arranged in a closed, endless loop (the same as described for supporting worktable 300) and interconnected by links 347. The bearing while being the same as described in FIGURE 19 is a bearing of less capacity than bearing 310 since its functional requirements do not involve as heavy loading, the only functional requirement being to overcome the described "hydrofoil" effect.

When shock load or heavier loads occur on the table 300, instead of bearing 310 being stressed beyond its upper limit, the load is absorbed by the slidable bearing 310 provided between surfaces 328 and 321, these surfaces being separated by a gap of optimum dimension and maintaining an oil film of a desired dimension. Under kinetic conditions, the effect known as "hydrofoiling" which occurs at the sliding bearing is prevented by holding the table down against through bearings 346 and overcoming such lifting effect, and thereby maintaining more precisely the position of the table during its reciprocable movement and obtaining a more accurate machine operation.

The compound bearing in this case, as in the previous embodiments, is a combination of antifriction bearings (roller bearings) which sustain the load under low load conditions and during static conditions or while the worktable is undergoing a reversal of direction and of a sliding bearing which is operative under heavy load, shock load and the like. In this way, the advantages of an antifriction bearing support are entirely obtained. However, in each instance, as the movement increases and conditions shift from a static to a dynamic condition, the sliding bearing becomes functional, but its disadvantages are obviated, including the objectional "hydrofoil" effect. There is provided, in other words, a preloaded antifriction element which is deformable and is backed by a slidable type oil film surface.

Although the present invention has been illustrated and described in connection with selected example embodiments, it will be understood that these are illustrative of the invention and are by no means restrictive thereof. It is reasonably to be presumed that those skilled in this art can make numerous revisions and adaptations of the invention without departing from the underlying principles of the invention. It is intended that such revisions and variations which incorporate the herein disclosed principles will be included within the scope of the following claims as equivalents of the invention.

I claim:

1. A compound bearing construction comprising: a first member and a second member movable relatively thereto, said first and second members being spaced apart and having a plurality of bearing surfaces including opposed substantially parallel friction type bearing surfaces, antifriction bearing means disposed between said members and engageable with each to provide a combination of both support and guidance for each to provide a combination of both support and guidance for each of said first and second members, said antifriction bearing means being resiliently deformable to provide for closing movement between said first and second members that diminishes the clearance spacing between said members within the elastic limits of deformation of said antifriction bearing means, preloading means for forming said antifriction bearing means within the elastic limits to increase the contact area between the respective antifriction bearing means and their coacting opposed bearing surfaces, said friction type bearing surfaces being located to receive lateral thrust beyond the strength limitation of said antifriction bearing means for supporting high orders of loads of relatively short duration causing said friction type bearing surfaces to move closer together by an amount which is within the elastic limits of said antifriction bearing means and providing both support and guidance between said first and second members as said antifriction bearing means are deformed within predetermined limits, and means providing lubrication within the spacing separating said first and second members to lubricate the movement between said slidable friction type bearing means.

2. A compound bearing construction in accordance with claim 1 wherein said antifriction bearing means are comprised of rotatable bearing elements which are disposed at spaced apart locations to provide bearing support for the movement between said first and second members.

3. A compound bearing construction in accordance with claim 1 wherein said means providing lubrication includes a pumping means for providing a flow of lubricant under pressure to within the spacing separating said first and second members.

4. A compound bearing construction in accordance with claim 1 wheerin said antifriction bearing means are comprised of hollow bearing elements which are deformable under pressure to increase the contact area between the bearing elements and their opposed surfaces and are of resilient contruction to resume their shape upon relief of such pressure.

5. A compound bearing construction in accordance with claim 1 in which said antifriction bearing means is in the form of a cage and a plurality of resilient deformable nonmetallic rotatable bearing elements are received within said cage and deformable therein.

6. A compound bearing construction in accordance with claim 1 including a carrier and a plurality of bearing elements mounted on said carrier, said carrier being deformable to effect transferral of bearing support under lateral loads from said antifriction bearing means to said slidable friction bearing surfaces which are located to receive lateral thrust.

7. A compound bearing construction in accordance with claim 1 wherein said antifriction bearing means includes a cage providing slidable friction type bearing surfaces and having antifriction bearing elements rotatably mounted at spaced locations within said cage.

8. A compound bearing construction in accordance with claim 1 wherein said first member and second member each includes a plurality of coating opposed surfaces each having antifriction bearing means and substantially parallel friction type bearing surfaces.

9. A compound bearing construction in accordance with claim 1 including a press wherein one of said members is provided by a press frame and the second of said members is provided by a press slide.

References Cited by the Examiner

UNITED STATES PATENTS

| | | | |
|---|---|---|---|
| 1,175,415 | 3/1916 | Egbert | 308—35 |
| 1,499,332 | 7/1924 | Baumman | 308—9 |
| 1,519,657 | 12/1924 | Biggert | 308—90 X |
| 1,631,810 | 6/1927 | Gruver | 308—6 |
| 1,898,273 | 2/1933 | Stevens | 308—6 |
| 1,946,652 | 2/1934 | Wallgren | 308—35 |
| 2,182,012 | 12/1939 | Bunnell | 308—35 |
| 2,352,911 | 7/1944 | Osplack | 308—35 |
| 2,373,860 | 4/1945 | Torresen | 308—35 X |
| 2,906,563 | 9/1959 | Conner | 308—6 |
| 3,016,720 | 1/1962 | Trobjevich | 308—202 X |
| 3,022,106 | 2/1962 | Mims | 308—208 X |
| 3,055,714 | 9/1962 | Coffin | 308—6 |
| 3,059,979 | 10/1962 | Hohl | 308—6 |
| 3,065,036 | 11/1962 | Trotter | 308—35 |
| 3,143,758 | 8/1964 | Dunham | 308—4 X |
| 3,122,133 | 2/1965 | Price | 308—6 X |

FOREIGN PATENTS

| | | |
|---|---|---|
| 464,649 | 8/1928 | Germany. |
| 38,537 | 5/1913 | Sweden. |
| 311,338 | 11/1952 | Switzerland. |

MARTIN P. SCHWADRON, *Primary Examiner.*

DAVID J. WILLIAMOWSKY, *Examiner.*

L. L. JOHNSON, *Assistant Examiner.*